(12) United States Patent
Haginoya et al.

(10) Patent No.: US 7,998,605 B2
(45) Date of Patent: Aug. 16, 2011

(54) MAGNETIC RECORDING MEDIUM AND METHOD FOR PRODUCTION THEREOF

(75) Inventors: Chiseki Haginoya, Tokyo (JP); Takashi Ando, Ibaraki-ken (JP); Masahiko Ogino, Ibaraki-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 741 days.

(21) Appl. No.: 11/522,204

(22) Filed: Sep. 15, 2006

(65) Prior Publication Data
US 2007/0072013 A1    Mar. 29, 2007

(30) Foreign Application Priority Data
Sep. 28, 2005  (JP) ................... 2005-282669

(51) Int. Cl.
*G11B 5/66* (2006.01)
(52) U.S. Cl. ...................... 428/832; 428/831.2
(58) Field of Classification Search .......... None
See application file for complete search history.

(56) References Cited

U.S. PATENT DOCUMENTS

| | | | |
|---|---|---|---|
| 5,772,905 A | 6/1998 | Chou | |
| 6,150,065 A * | 11/2000 | Kobayashi et al. | 430/83 |
| 6,518,189 B1 | 2/2003 | Chou | |
| 6,809,356 B2 | 10/2004 | Chou | |
| 2005/0287397 A1 * | 12/2005 | Soeno et al. | 428/831 |
| 2006/0093863 A1 * | 5/2006 | Tsuchiya et al. | 428/827 |
| 2006/0222896 A1 * | 10/2006 | Inomata et al. | 428/826 |
| 2008/0108831 A1 * | 5/2008 | Adam et al. | 548/453 |

FOREIGN PATENT DOCUMENTS

| | | |
|---|---|---|
| JP | 59-124030 | 7/1984 |
| JP | 60-195738 | 10/1985 |
| JP | 62-169643 | 7/1987 |
| JP | 62/188363 A2 | 8/1987 |
| JP | 63-222349 | 9/1988 |
| JP | 03-022211 | 1/1991 |
| JP | 04-238130 | 8/1992 |
| JP | 04-336404 | 11/1992 |
| JP | 06-231443 | 8/1994 |
| JP | 2003-178431 * | 6/2003 |
| JP | 2004/062995 | 2/2004 |
| JP | 2005038596 A | 2/2005 |
| WO | 03019540 A1 | 3/2003 |

OTHER PUBLICATIONS

English machine translation of JP 2004-062995, Feb. 2004.*
English machine translation of JP 2003-178431, Jun. 2003, Japan, Takenoiri et al.*
New, R.M.H. et al., "Submicron Patterning of Thin Cobalt Films for Magnetic Storage", *J. Vac. Sci. Technol. B*, vol. 12, No. 6, pp. 3196-3201, Nov./Dec. 1994.

(Continued)

*Primary Examiner* — Holly Rickman
(74) *Attorney, Agent, or Firm* — Zilka-Kotab, PC (57) ABSTRACT

Embodiments of the invention provide ways to manufacture an inexpensive high-density magnetic recording medium. A high-density magnetic recording medium is composed of a flat substrate, a nonmagnetic intermediary body having a periodic recessed-relieved structure, and a magnetic film formed on the intermediary body.

25 Claims, 4 Drawing Sheets

OTHER PUBLICATIONS

Rousseaux, F. et al., "Study of Large Area High Density Magnetic Dot Arrays Fabricated Using Synchrotron Radiation Based X-ray Lithography", *J. Vac. Sci. Technol. B*, vol. 13, No. 6, pp. 2787-2791, Nov./Dec. 1995.

Chou, Stephen et al., "Nanolithographically Defined Magnetic Structures and Quantum Magnetic Disk", *J. Appl. Phys.*, vol. 79, No. 8, pp. 6101-6106, Apr. 15, 1996.

Wachenschwanz, David et al., "Design of a Manufacturable Discrete Track Recording Medium", *IEEE Transactions on Magnetics*, vol. 41, No. 2, pp. 670-675, Feb. 2005.

Hattori, Kazuhiro et al., "Fabrication of Discrete Track Perpendicular Media for High Recording Density", *IEEE Transactions on Magnetics*, vol. 40, No. 4, pp. 2510-2515, Jul. 2004.

Toivola, Yvete et al., "Organosilicate Spin-On Glasses II. Effect if Physical Modification on Mechanical Properties", *Journal of the Electrochemical Society*, vol. 151, No. 3, pp. F45-F53, Jan. 26, 2004.

Chou et al., "Imprint Lithography with 25-Nanometer Resolution," Science, vol. 272, Apr. 5, 1996, p. 85-87.

* cited by examiner

MAGNETIC RECORDING MEDIUM AND METHOD FOR PRODUCTION THEREOF

CROSS-REFERENCES TO RELATED APPLICATIONS

This application claims priority from Japanese Patent Application No. JP2005-282669, filed Sep. 28, 2005, the entire disclosure of which is incorporated herein by reference.

BACKGROUND OF THE INVENTION

The present invention relates to a magnetic recording unit and, more particularly, to a magnetic recording medium and a method for production thereof.

Among magnetic recording medium proposed so far are one with artificially patterned recording tracks (discrete track medium "DTM") and one with patterned recording bits (patterned medium "PM" or discrete bit medium "DBM"). (See Japanese Patent No. 188363 and Japanese Patent Laid-open Nos. Hei-6-231443 and Hei-4-336404, for example.) For their increased recording density, the PM and DTM require microfabrication of submicron order for the recessed-relieved structure corresponding to the bits and tracks. Such a microstructure is to be formed by means of electron beam lithography "EBL" (as disclosed in R. M. H. New et al., JVST B 12 (1994), p. 3196) or X-ray lithography (as disclosed in F. Rousseaux et al., JVST B 13 (1995), p. 2787). Unfortunately, EBL and X ray lithography cause high production cost.

One way to produce the microstructure of submicron order efficiently at a low cost is by imprinting to form micropatterns (as disclosed in S. Y. Chou et al., SCIENCE 272 (1996), p. 85). Imprinting is designed to bring a preformed mold into close contact with a coated substrate, thereby replicating the recessed-relieved structure of the mold in the coating on the substrate. Imprinting includes several methods as listed below.

Thermal imprinting that employs a thermoplastic resin as the transferred body. The process consists of softening the thermoplastic resin on a substrate by heating above its glass transition temperature (Tg), pressing a mold against the softened resin, cooling the mold and resin, and removing the cured resin.

Photo-imprinting that employs a photo-curable resin as the transferred body. The process consists of pressing a mold against the photo-curable resin coated on a substrate and irradiating the resin with light to achieve photocuring.

Chemical imprinting that employs as the transferred body a resin that softens in a specific atmosphere.

All of the methods mentioned above involve the steps of pressing a mold against a resin as the transferred body, curing the resin, and removing the mold, thereby replicating the recessed-relieved structure of the mold in the transferred body. According to U.S. Pat. No. 5,772,905, the recessed-relieved structure replicated in the transferred body on the substrate is used as a mask for the etching of the substrate.

Production of magnetic recording medium by the above-mentioned imprinting technology is reported in S. Y. Chou et al., JAP 79 (1996), p. 6101 (for PM) and D. Wachenschwanz et al., JAP 79 (1996), p. 6101 (for DTM). Production of magnetic recording medium by liftoff is reported also in S. Y. Chou et al., JAP 79 (1996), p. 6101. There is disclosed another method for producing a magnetic recording medium by forming a resist structure on a flat magnetic film and etching the magnetic film through the resist structure as a mask. See K. Hattori et al., IEEE Trans. Magn. 40 (2004), p. 2510. What is common to the technologies mentioned above is that the transfer resist used as the mask is removed eventually.

U.S. Pat. Nos. 6,809,356 and 6,518,189 disclose a technology for deforming a resist film by imprinting with heat and pressure and using the deformed resist film as a CD for high-density recording. Japanese Patent Laid-open No. 2003-178431 discloses a method for producing a magnetic recording medium by coating a soft magnetic layer with a thermoplastic material, patterning the thermoplastic material with heat and pressure, and embedding the magnetic layer in recesses formed by patterning. Japanese Patent Laid-open No. 2004-62995 discloses a substrate for a magnetic recording medium, said substrate containing a thermoplastic resin in which are formed recessed-relieved patterns. Japanese Patent Laid-open Nos. Sho-59-124030, Sho-60-195738, and Sho-63-222349 disclose a magnetic recording medium or opto-magnetic recording medium having the recessed-relived structure formed thereon. Japanese Patent Laid-open No. Sho-62-169643 discloses a vinyl ester that is used directly as the substrate of optical recording medium.

Making the microstructure in magnetic recording medium by means of electron beam lithography or X ray lithography involves difficulties in mass production because of its high cost. The above-mentioned imprinting technology to make the recessed-relieved structure by means of heat and pressure is applicable only to thermoplastic resins. The CD is a medium for replay only and hence its technology is not applied to magnetic recording medium for recording and reproduction. In other words, the CD technology does not assume piled magnetic recording layers having magnetic properties necessary for the recessed-relieved structure. The technologies disclosed in Japanese Patent Laid-open Nos. 2003-178431 and 2004-62995 do not permit reheating the thermoplastic resin (beyond its melting point or softening point) once the recessed-relieved structure has been formed thereon. The methods disclosed in Japanese Patent Laid-open Nos. Sho-59-124030, Sho-60-195738, and Sho-63-222349 are intended to prevent adherence, and they are not designed to make the magnetic structure for PM and DTM. The optical or magneto-optical recording disclosed in Japanese Patent Laid-open No. Sho-62-169643 is limited less than magnetic recording in the flatness and hardness of the substrate because it permits a larger head flying height. Although magnetic recording media are greatly affected by the flatness and hardness of the substrate, the disclosed material and system do not provide the satisfactory flatness and hardness required of them and hence they cannot be applied to the substrate for magnetic recording medium. Moreover, the disclosed material is limited in heat resistance and hence in heat treatment temperature (60 to 200° C.); therefore, it is not suitable for the magnetic recording medium that need heat treatment at high temperatures for their specific magnetic properties.

BRIEF SUMMARY OF THE INVENTION

It is a feature of the present invention to provide a magnetic recording medium with a recessed-relieved structure of submicron order that permits high-density recording. It is another feature of the present invention to provide a method for producing said magnetic recording medium efficiently and economically without restrictions as to the material for the substrate.

The resist or thermoplastic resin that is directly used to form the recessed-relieved structure on the substrate is so poor in mechanical strength and chemical stability that it cannot be heated above its melting point after shaping. This prevents the magnetic recording layer on the recessed-relieved structure on the substrate from acquiring the magnetic characteristics required of the magnetic recording medium. Although the problem with heat resistance may be solved by employing the technology for etching the substrate through the resist as a mask, there remains another problem with low productivity and high production cost.

The magnetic recording medium according to the present invention is characterized by a nonmagnetic intermediary body having recessed-relieved structure arranged on a flat substrate. The nonmagnetic intermediary body is formed by imprinting that transfers a pattern onto a transferring body on the substrate. On the nonmagnetic intermediary body, magnetic recording layer is deposited to complete the desired magnetic recording medium. The nonmagnetic intermediary body is formed from a photo-curable or thermosetting material. After curing, it should have heat resistance higher than 200° C. To increase hardness and to ensure adhesion to the substrate, the nonmagnetic intermediary body may be baked, if necessary, before the magnetic recording layer is deposited thereon. This helps reduce the production cost of the magnetic recording medium. The nonmagnetic intermediary body may also be formed by light exposure in place of imprinting.

The method of the present invention permits efficient and economical production of high-density magnetic recoding medium without requiring the steps of etching and milling. It also makes it possible to easily form the recessed-relieved structure with magnetic properties which are necessary for magnetic separation of tracks or bits. The magnetic recording medium of the present invention consists of a substrate and a magnetic recording layer, which are physically or chemically separated from each other. This construction permits a wide selection of cheaper and harder materials for the substrate.

DETAILED DESCRIPTION OF THE INVENTION

The embodiments of the present invention will be described below with reference to the accompanying drawings.

Example 1

Figure 1:
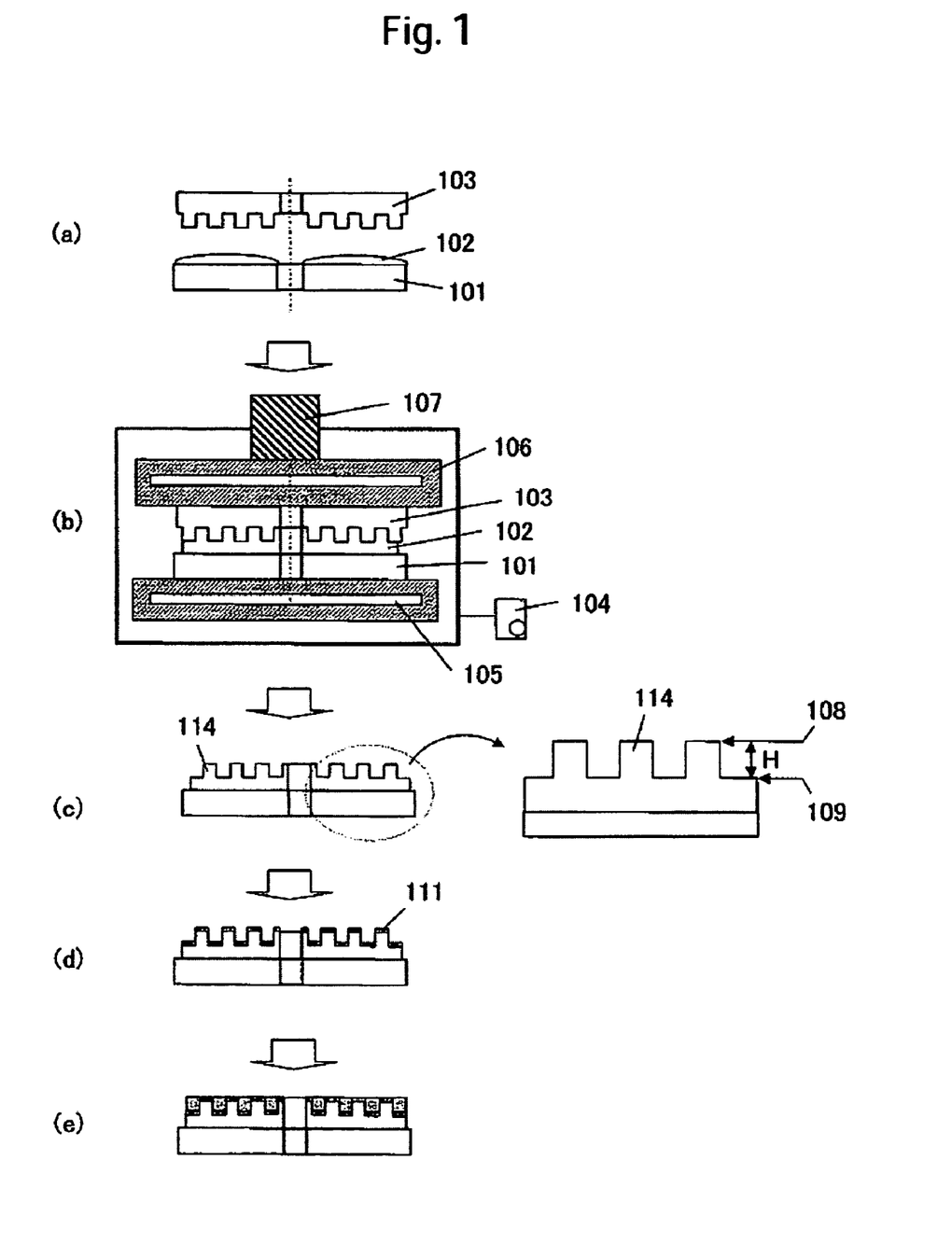
FIG. 1 is a schematic diagram illustrating the process of making the magnetic recording medium according to the present invention.

FIG. 1 is a schematic diagram illustrating the process of making the magnetic recording medium according to the present invention. This example demonstrates the production of a magnetic recording medium of discrete track medium in which individual tracks are magnetically divided. The method shown in this example is applicable also to the production of a magnetic recording medium of patterned bit type. (Detailed description is omitted.)

Step 1: First, a substrate 101 shown in FIG. 1(a) was made ready for processing. It is a commercial flat glass disk measuring 0.635 mm in thickness and 65 mm in diameter and having a hardness of 700 Hv. It has a central hole, 20 mm in diameter, to facilitate its mounting on a hard disk drive. Processing started with cleaning, which was followed by oxygen treatment to improve the wettability of the surface of the substrate 101. Incidentally, oxygen treatment may be replaced by any other adequate method because the wettability is determined only by the interface energy between the substrate 101 and the transferred body 102. Alternatively, an adhesion layer may be formed to achieve the same object. Oxygen treatment may be omitted.

A thermosetting liquid silicone was applied dropwise onto the substrate 101 to form the transferred body 102 thereon. (The transferred body 102 may be formed on the mold 103.) The transferred body 102 was formed from so-called spin-on-glass (SOG). The SOG used in this example is a commercial one for semiconductors which is devoid of a pore-generating component (as mentioned later).

The mold 103 used in this example is a silicon mold which has circumferential tracks formed by electron beam (EB) writing and reactive ion etching (RIE). It also has a configuration containing servo information. Incidentally, the mold 103 may be one which is formed from semiconductor (other than silicon), metal, quartz, or resin. Also, the EB lithography may be replaced by such microfabrication technology as optical lithography, ion-beam lithography (IBL), and focused ion beam process (FIB). The mold 103 may also be formed by replicating another mold by imprinting. The surface of the mold 103 was coated with release treatment to facilitate peeling that follows patterning. The mold 103 has an outer diameter of 70 mm, which is large enough to facilitate peeling. The outside diameter may be equal to or smaller than 65 mm (which is the outer diameter of the substrate 101). The mold 103 has a hole, 20 mm in diameter, at its center, as in the case of the substrate 101. The center holes in the substrate 101 and the mold 103 facilitate their alignment. In the case where patterns are to be formed on both sides of the mold, notches are formed on the periphery of both sides of the mold so that the directions of the patterns are aligned. In this case, notches may or may not be formed on the substrate.

The pattern in the mold 103 is a mirror image of the pattern to be used for the magnetic recording medium. The circumferential pattern corresponds to the recording track. The circumferential pattern is supplemented with the servo pattern. The surface of the mold 103 has recessed parts (grooves) and relieved parts (lands) such that the difference in height between them is 80 nm. This value may vary depending on the thickness of the magnetic film, the track pitch, and the width of the land (relieved part). The track pitch is not uniform over the entire surface but it varies according to the yaw angle in the HDD. (The track pitch variation was determined with reference to WO2003/019540.) In this example, the track pitch is 150 nm at the disk radius (r) of 20 mm. The ratio in width between the land and the groove is 1:1 (or their width is 75 nm each). The land at this position of the mold 103 has a height-to-width ratio of about 1.07 which is close to 1. This value may be changed according to need. In the case of the patterned magnetic recording medium mentioned herein, patterning may be accomplished such that individual bits are independent.

In this example, the transferred body 102 on the substrate 101 is so-called SOG. SOG is a common material used for interlayer insulating film in the semiconductor industry. SOG used in the semiconductor industry is incorporated with a substance to generate bubbles 25 for reduction of dielectric constant. Such bubbles, however, are known to decrease hardness (as reported in Y. Toivola et al., J. ECS 151 (2004) p. F45). The substrate for the magnetic disk is urgently required to have (1) good surface flatness, (2) high hardness, and (3) good thermal and chemical stability; however, it does not require low dielectric constant. It was found that SOG meets the above-mentioned requirements if it contains impurities and 30 bubbles in such an amount that the volume-pore density is less than 0.05. Therefore, the SOG used in this example is one which is purified so that the volume-pore density is less than about 0.05. In this way it was possible to obtain an intermediary body with a high degree of flatness. The nonmagnetic intermediary body is one which may be formed from a photo-curable material or a thermoplastic material and which may have heat resistance in excess of about 200° C., in several embodiments. In more embodiments, the nonmagnetic intermediary body may have a recessed-relieved structure corresponding to a track pitch or a bit period on a surface thereof.

Step 2: In Step 2, the substrate 101 (coated with a liquid for the transferred body 102) and the mold 103 were placed in the imprinting chamber as shown in FIG. 1(b). (For correction of inclination or small irregularities, a cushioning material (not shown) was placed on one side or both sides of the substrate 101 and the mold 103 with which the pressure plate 106 comes into contact. Alignment of the substrate 101 and the mold 103 was accomplished by means of their center holes (not shown). The foregoing procedure may be replaced by placing transfer bodies on both sides of the substrate 101 and pressing patterned molds against them downward and upward so that the recessed-relieved structure is transferred to both sides of the substrate 101. (This procedure is not shown.) The molds used for transfer may have different patterns on its upper and lower sides.

The imprinting chamber was evacuated by the vacuum pump 104. After the pressure in the chamber had decreased sufficiently, the mold 103 was pressed against the substrate 101 by the pressure plate 106. The pressure applied by the press system 107 varies depending on the structure, the transferred body, and the pressing time. The pressure in this example was 0.5 MPa. After pressing, the transferred body is heated by means of the heating-cooling mechanism 105. In this example, heating was carried out at 150° C. for 1 minute. The heating temperature and time should be properly adjusted according to the thickness and structure of the transferred body. At a temperature lower than necessary, the transferred body will not undergo adequate deformation and curing; at a temperature higher than necessary, the transferred body will take a long processing time and suffer deterioration. Then, the substrate 101 (with the transferred body) and the mold 103 were cooled. After cooling to a prescribed temperature, the mold 103 was peeled off. Thus there was obtained the desired structure transferred to the transferred body 102. In this example, the cooling temperature before peeling was 80° C. The cooling temperature may be changed within a range for the adequate recessed-relieved structure. The step of peeling may be accomplished inside or outside the imprinting chamber.

Step 3: FIG. 1(c) is a schematic diagram illustrating the substrate and the intermediary body 114 to which the pattern has been transferred. In this example, the intermediary body 114 is formed from the same material as the transferred body mentioned in Step 2. Since it has the recessed-relieved structure after curing, it is called the intermediary body to distinguish from the transferred body in liquid form. As can be seen in the embodiment of FIG. 1(c), the recessed-relieved structure of the nonmagnetic intermediary body 114 does not extend to a surface of the substrate 101.

The right part of FIG. 1(c) is a partly enlarged view of the intermediary body 114 having the recessed-relieved structure. The transferred structure has a recessed-relieved cross section. In this structure, the salient-region surface 108 represents the surface of each relieved part. The salient-region surface 108 has a microscopic surface roughness smaller than 2.0 nm. However, since the substrate 101 itself has a wavy surface (several micrometers), the macroscopic difference in height may be one which includes such waviness. The recessed-region surface 109 is not restricted in surface roughness. The height difference H, which is an average difference between the salient-region surface 108 and the recessed-region surface 109, is 80 nm in this example. This value coincides with the difference in recessed parts and relieved parts in the mold; this means that the transferred body has penetrated into the deepest recessed part of the mold at the time of imprinting under pressure. It is not essential that the transferred body penetrates into the deepest recessed part of the mold and it is acceptable that the height difference H in the intermediary body is smaller than the recessed part of the mold. Although the height difference H in the intermediary body could be larger than the depth of the recessed part of the mold under some peeling conditions, this poses no problem unless the desired structure is deteriorated.

Step 4: In this step, surface smoothing, texturing, or cleaning are carried out according to need. The surface smoothing in this step is intended to make uniform the height of the salient-region surface 108 but not to flatten the recessed-relieved structure produced as mentioned above. Subsequently, the magnetic recording layer 111 is formed by deposition on the intermediary body as shown in FIG. 1(d). The magnetic recording layer in this example denotes any structure that has characteristic properties necessary for magnetic recording. It was formed according to the procedure disclosed in Japanese Patent Laid-open No. 2005-38596. It is composed of a precoat layer, magnetic domain control layer, soft magnetic under layer, intermediate layer, perpendicular recording layer, and protective layer, which were sequentially formed on the intermediary body by DC magnetron sputtering. The magnetic domain control layer is comprised of a nonmagnetic layer and a diamagnetic layer. The precoat layer, magnetic domain control layer, and soft magnetic underlayer were formed at room temperature, and the intermediate layer and perpendicular recording layer were formed with heating at 200° C. by a lamp heater. After deposition of the perpendicular recording layer, the coated intermediary body was cooled to about 100° C. in a magnetic field.

The intermediary body should be formed from a material which is exempt from deformation and unsticking during heat treatment at the desired temperature. The material for the intermediary body used in this example should have heat resistance above about 200° C. because the process in this example involves heating up to 200° C. Even though any other process than mentioned herein is employed to produce the magnetic recording medium, the material for the intermediary body is required to have heat resistance above the maximum temperature encountered in the process. Also, even though the process does not involve heating at high temperatures, the intermediary body is required to have heat resistance above 100° C. (at the lowest) because there is the possibility that the magnetic recording medium mounted on the drive is exposed to heat close to 100° C. during operation. The protective layer is finally formed. However, this step may be postponed until the next step of planarization. The process of forming the protective layer may be repeated twice before and after planarization.

The perpendicular recording layer is 20 nm thick and is formed from CoCrPt alloy according to the disclosure in the above-mentioned document. It may also be formed from an alloy containing any other elements or a material that assumes the superlattice structure such as Co/Pd multilayer film. The soft magnetic underlayer is formed from CoTaZr alloy disclosed in the above-mentioned document. It should preferably be as thin as possible so long as it exhibits the magnetic properties in response to the recessed-relieved structure. In this example, the soft magnetic underlayer has a thickness of 70 nm, and the magnetic recording layer has a total thickness of 150 nm. Incidentally, reduction of the total film thickness makes it possible to reduce the height difference H in the recessed-relieved structure formed in the transferred body 102 and hence to reduce the difference between recess and relief in the mold. In other words, the height difference H should be determined according to the thickness of the magnetic recording layer to give the desired magnetic properties and also according to the method of molding.

Step 5: The surface is planarized according to need. The planarizing process is accomplished by embedding a non-magnetic material in the recessed part and then performing chemical mechanical polishing or milling on the entire surface, as shown in FIG. 1(e). The nonmagnetic material to be embedded may be an insulating material (such as $Al_2O_3$ and $SiO_2$), a metal (such as Al), or an organic compound. It may contain a magnetic material in too small an amount to affect the read-write characteristics. The planarized surface is subsequently coated with an optional protective film and lubricating film. The protective film which covers the perpendicular recording layer on the relieved part should have a thickness smaller than about 10 nm. The reason for this is that the protective film with an excessively large thickness increases the effective flying height, which deteriorates the read-write characteristics. On the other hand, the protective film with an excessively small thickness does not achieve this object. The protective film in this example has a thickness of 5 nm.

The substrate for the magnetic recording medium is required to have a certain degree of hardness, so that the magnetic recording medium is less subject to track misregistration and error rate that occur due to disk fluttering during operation. For a glass substrate, this object is effectively achieved by impregnating its surface with an alkali metal, which is known as the chemical tempering method. (See Sue et al., IDEMA 36 (2000) p. 10.) On the other hand, the magnetic recording layer in the magnetic recording medium is formed from a metal; however, it is known that metal deteriorates in magnetic and mechanical properties due to corrosion. Therefore, the chemically tempered glass substrate for the conventional magnetic recording medium is carefully prepared so that residues remaining on it produce no adverse effect on the magnetic recording layer. To this end, close attention is paid to selection of additives, fabrication of substrate, and cleaning process (to keep low the concentrations of impurities, particularly alkaline ones, on the substrate surface). However, this is not the case with this example in which the substrate and the magnetic recording layer are separated from each other by the intermediary body and hence they never come into direct contact with each other. Thus this example is free from restrictions on impurities in the substrate and hence offers a wider selection of materials for harder and cheaper substrates.

On the other hand, the intermediary body which comes into direct contact with the magnetic recording layer has restrictions on the concentration of impurities for the foregoing reasons. In this example, the concentration of impurities (alkali ions) in the intermediary body should be lower than about 1 ppm. Any intermediary body containing more alkaline impurities than that specified above will deteriorate the long-term reliability. The intermediary body should preferably have a minimum thickness larger than a certain value so that it prevents the diffusion of impurities from the substrate surface as mentioned above. This will be described later in more detail with reference to the accompanying drawings.

The above-mentioned process permits the efficient economical production of the magnetic recording medium with improved characteristic properties. The completed magnetic recording medium was mounted on a magnetic recording unit to see if it performs recording and reproduction satisfactorily. The results are mentioned in detail in Example 3.

Example 2

Figure 2:
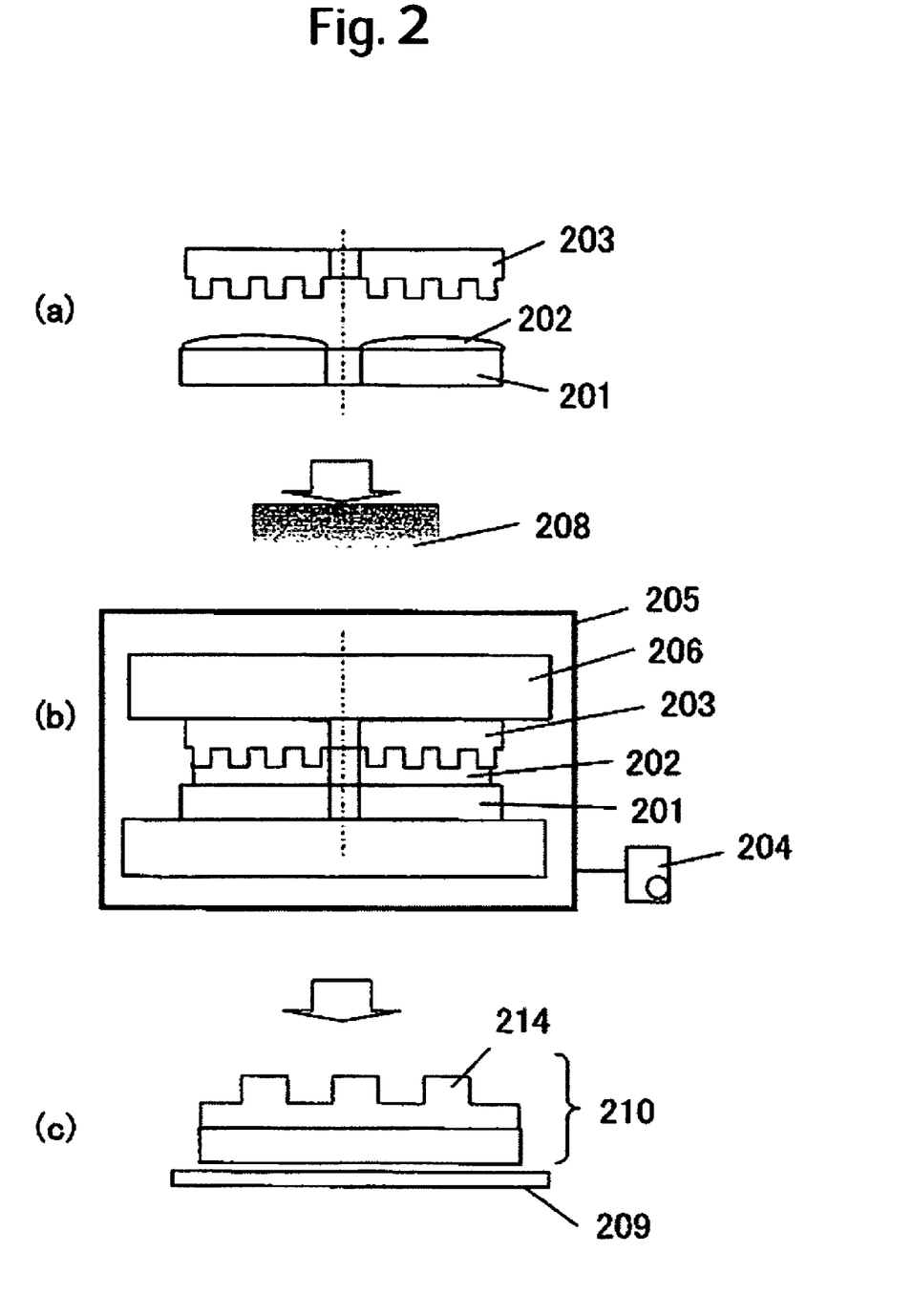
FIG. 2 is a schematic diagram illustrating the process of making the magnetic recording medium according to the present invention.

FIG. 2 is a schematic diagram illustrating the process of producing the magnetic recording medium according to the present invention. This example demonstrates the production of the so-called discrete track recording medium which has magnetically divided recording tracks.

Step 1: The substrate 201 shown in FIG. 2(a) is a chemical tempered glass disk, 0.635 mm in thickness and 65 mm in diameter. The substrate has limited restrictions on the concentration of impurities thereon because the recording medium according to the present invention has an intermediary body. In this example, the material for the substrate was selected from those which have a high surface hardness, but it was not examined for the concentrations of residues on the substrate surface. The substrate 201 has a previously made hole, 20 mm in diameter, at its center. This hole facilitates the mounting on the hard disk drive. The substrate 201 underwent cleaning and then oxygen treatment (which makes the substrate surface more wettable). However, there may be an instance where a process other than oxygen treatment is more desirable because wettability depends on interface energy between the substrate 201 and the transferred body 202. Doing nothing is one choice.

Onto the substrate 201 was dropped a solution of photocurable silicon compound for the transferred body 202. The photocurable silicon compound is ORMOCER® from Microresist Co., Ltd. Dropping was accomplished by using a dispenser. The solution was dropped at 16 spots on the surface of the substrate 201. Spin coating may also be employed.

The mold 203 is a quartz disk, 1.0 mm in thickness and 65 mm in diameter. This quartz disk has a structure patterned thereon which is necessary for the magnetic recording medium. The structure necessary for the magnetic recording medium includes tracks as well as servo pattern. The mold pattern should be designed by noting that the mold pattern is a mirror image of the actually transferred pattern. The mold 203 in this example should be large enough for the so-called discrete track medium with a track pitch of 100 nm.

The mold used in this example is a replica of an original (not shown) prepared in the following manner. First, a silicon substrate is given the recessed-relieved structure by electron beam (EB) lithography and etching. The recessed-relieved structure is transferred to a quartz substrate by the imprinting method. Finally, the quartz substrate undergoes etching. The EB lithography for the original may be replaced by any other process such as ion beam lithography, focused ion beam (FIB) process, X-ray lithograph, and mold replication by imprinting. It is also possible to make the mold directly (without making the replica) by EB lithography and etching.

The mold 203 in this example is made of transparent quarts because the transferred body 203 has to be irradiated with light. It may be made of silicon (in place of quartz) if irradiation is possible from the side of the substrate 201. The term "transparent" used in this example implies that the mold transmits light with a specific wavelength to cure the transferred body 202.

Step 2: A solution for the transferred body 202 was dropped onto the substrate 201. The substrate 201 and the mold 203 were placed in the imprinting chamber 205, as shown in FIG. 2(b). Alignment of the substrate 201 and the mold 203 was accomplished by means of their center holes (not shown). This mechanical alignment attained an accuracy of ±50 μm in the axial direction. The mechanical alignment may be replaced by an optical one. Although not shown, it is also possible to transfer the recessed-relieved structure onto both sides of the substrate 201 if the transferred body is formed on both sides of the substrate 201 and molds with desired patterns are pressed against the substrate 201 upward and downward. In this case, the upper and lower molds have different patterns to be transferred. For convenience of explanation, FIG. 2 illustrates that the mold 203 and the transferred body 202 are brought into contact with each other outside the imprinting chamber 205. According to the desirable procedure, however, the mold 203 is first placed in the imprinting chamber 205 and then the transferred body 202 is brought into contact with the mold 203 in the imprinting chamber 205.

The imprinting chamber 205 is connected to the vacuum pump 204, so that it is evacuated to a sufficiently low pressure. Evacuation helps the transferred body 202 to readily penetrate into the fine pattern on the mold 203 and also prevents incomplete curing caused by oxygen inhibition. However, evacuation is not necessarily essential; it may be omitted if circumstances permit (depending on the pattern structure and the type of the transferred body 202). The light source 208 should contain the light of specific wavelength to cure the transferred body 202, and the pressing plate 206 should transmit such light. The light which has passed through the pressing plate 206 has a certain intensity which determines the time required for the transferred body 202 to complete curing. Therefore, it is necessary to adequately establish the intensity of the light source and the transmission and thickness of the pressing plate 206 in consideration of the output to be achieved by the imprinting process. In this example, the light source 208 emits UV light (100 mW/cm$^{22}$) and the pressing plate 206 has a thickness of 20 mm.

Pressing by the pressing plate 206 against the substrate 201 and the mold 203 is continued. After complete penetration of the transferred body 202 into the recessed-relieved pattern on the mold 203, the light source 208 is turned on for irradiation with light. After irradiation with sufficient light, pressing and evacuation are suspended, and the mold 203 and the intermediary body 214 are separated from each other. Although the transferred body 202 and the intermediary body 214 are made of the same material, they are distinguished from each other by calling the object in liquid state (before curing) the transferred body and calling the object in solid state (after curing) the intermediary body. Separation of the intermediary body 214 from the mold 103 may be accomplished either inside or outside the imprinting chamber 205. It should preferably be performed inside the imprinting chamber 205 to increase output and prevent contamination.

Step 3: Now, the substrate 201 and the intermediary body 214 formed thereon constitute the disk substrate 210. The disk substrate 210 is heated by the baking heater 209 as shown in FIG. 2(c). The baking heater may be replaced by a lamp heater or any other heating means. This heating step completely cures the intermediary body 214 and causes it to firmly adhere to the substrate 201. In this example, heating was carried out at 200° C. for 1 hour. The heating temperature and time should be properly adjusted according to the type of the transferred body and the characteristic properties required of the disk substrate. Heating may be performed inside the imprinting chamber 205 or after removal from the imprinting chamber 205 (not shown). In the former case, the imprinting chamber 204 may be evacuated by the vacuum pump 204 while heating.

Figure 3:
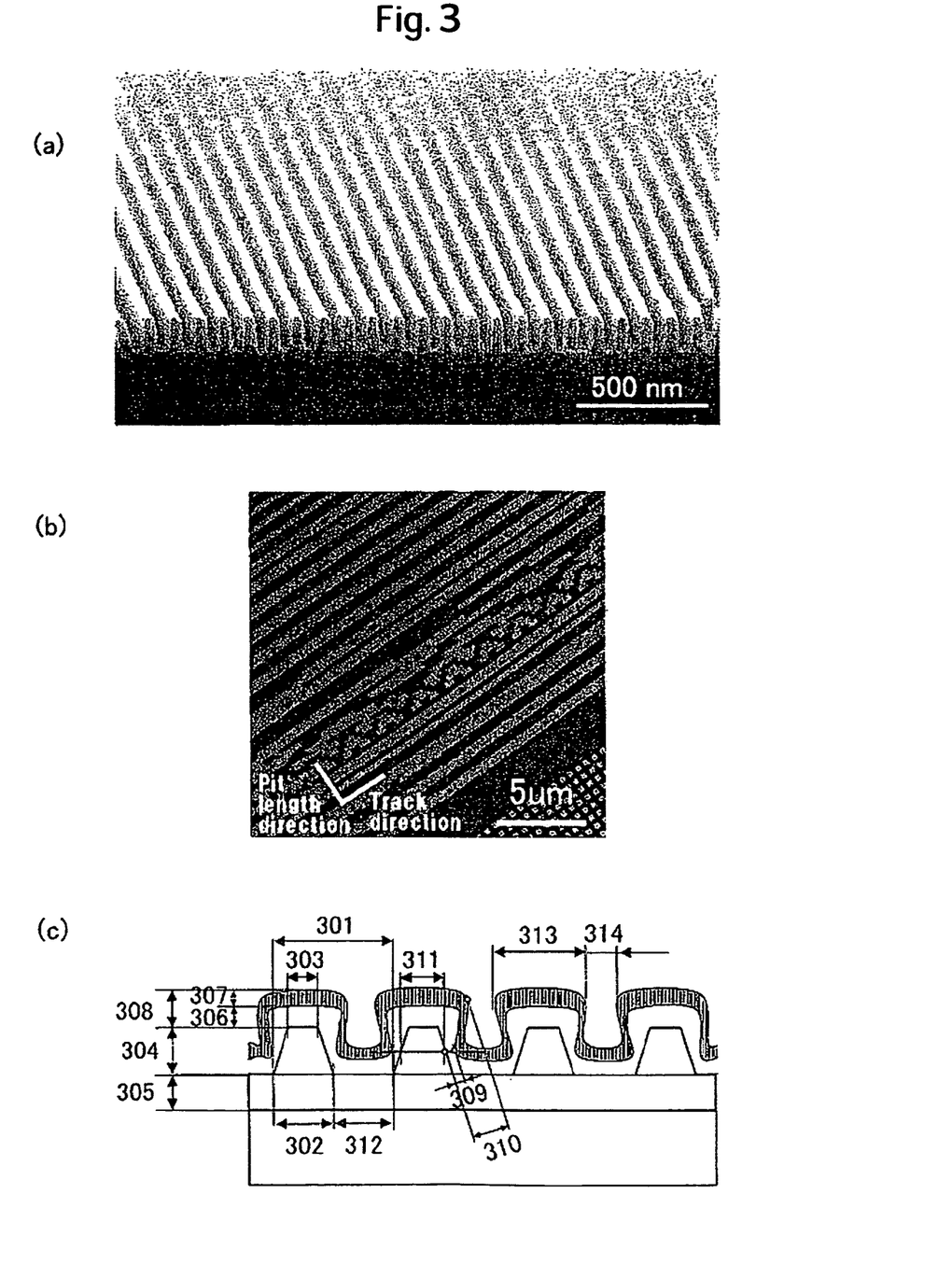
FIG. 3 is a schematic diagram illustrating one example of the present invention.

The recessed-relieved structure obtained by the above-mentioned process was observed under a scanning electron microscope. The results are shown in FIG. 3(a). The image shows the cross section of tracks on the specimen prepared in Example 2. It is noted that the specimen has the recessed-relieved structure corresponding to the track pitch of 100 nm. FIG. 3(b) is an images of atomic force microscope (AFM) showing the recessed-relieved structure of the servo pattern formed in this example. This image shows the relieved part bright and shows the recessed part dark on account of the color table employed. It is also noted that servo information is represented by the recessed-relieved structure in place of magnetic information. After the recessed-relieved structure has been completed, the same steps as in Example 1 are repeated to complete the magnetic recording medium.

The above-mentioned process yields excellent magnetic recording medium more efficiently and more economically than the process which requires substrate etching. The step of transferring the recessed-relieved structure by contacting the mold, which was used in this example, may be replaced by light exposure through a mask to make the recessed-relieved structure. In this case, it is necessary to use an adequate photo resist (as the transferred body) which forms the recessed-relieved structure after exposure and development. The completed magnetic recording medium was mounted on a magnetic recording unit to see if it performs read-write operation satisfactorily. The results are mentioned in detail in Example 3.

FIG. 3(c) is a schematic sectional view (in the track direction) of the magnetic recording medium in this example, with the magnetic recording layer deposited. 301 denotes the track pitch (Tp), 302 denotes the width of the bottom region of the relieved part (Wb), 303 denotes the width of the top region of the relieved part (Wt), 311 denotes the half-value width of the relieved part (Whf), 312 denotes the groove width (Wg), and 304 denotes the height of structure (H) (difference between the recessed part and the relieved part). Incidentally, Tp=Wb+Wg. 305 denotes the thickness of the base layer (Hb). The thickness of the base layer implies the thickness of the flat part between the surface of the recessed part and the surface of the flat substrate in the intermediary body. In FIG. 3(c), the magnetic recording layer on the intermediary body is comprised only of the soft magnetic underlayer and the perpendicular recording layer, with other components omitted. 306 denotes the thickness of the soft magnetic underlayer on the relieved part (tSUL), 307 denotes the thickness of the perpendicular recording layer on the relieved part (tMAG), and 308 denotes the thickness of the magnetic recording layer on the relieved part (t). In actuality, t>tSUL+tMAG, because there are other layers which are not shown in the figure. 309 denotes the minimum thickness of the soft magnetic underlayer on the side wall (Tside_SUL) and 310 denotes the maximum thickness of the magnetic recording layer (Tsidemax) on the side wall. In the case where the side is not straight, Tside_SUL and Tsidemax are defined according to the slope at the point where there exists the half value width of the difference (H) in height between the recessed part and the relieved part. 313 denotes the width of the track (Tw) and 314 denotes the width of the nonmagnetic region (Wn). The nonmagnetic body may be air or an inorganic material (such as Al O and Si O) or an organic material. For DTM, Tw should be larger than Tn so that the reproduced signals have a certain degree of strength. Incidentally, information is not recorded in the perpendicular recording layer in the Wn region while the magnetic recording medium is running in the drive. Servo and signal processing are performed so that recording and reproduction are performed while the read-write head is moving on the Tw region.

The soft magnetic underlayer absorbs the magnetic flux from the main pole of the write head, which has a geometrical track with (Tww-geo) approximately equal to Tw, and returns it to the auxiliary pole, which is wider than Tp. Therefore, the soft magnetic underlayer is required to be continuous with its adjacent relieved parts, as shown in the figure. That is, it is necessary that Tside_SUL>0. Moreover, in the case where the material mentioned in the foregoing examples is used, it is desirable that Tside_SUL>20 nm. If a high permeability material is used, it is possible to reduce Tside_SUL. Usually, Tside_SUL<tSUL.

When the recording layer on one track is strongly magnetically coupled with the recording layer on the adjacent track, DTM or PM does not produce its inherent effect. Therefore, it is necessary that Wn>0 so that the perpendicular recording layers in the adjacent tracks do not connect with each other. This requirement is effectively met by reducing Tsidemax while maintaining the necessary tMAG and tSUL. The Tsidemax varies depending on the shape of the relieved part, the thickness (t) of the magnetic recording layer, and the condition for deposition.

The condition necessary to obtain the above-mentioned shape is determined by the shape of the relieved part and the condition for deposition of the soft magnetic underlayer. The affective conditions for deposition include the incident direction, the deposition rate, the pressure of sputtering gas, the flow rate of sputtering gas, sputtering time and temperature, and thickness of a deposition film. It is necessary to select adequate conditions for each sublayer in the magnetic recording layer. The indexes specifying the shape of the relieved part of interest include Wb, Wt, Whf, and H mentioned above. In general, the relieved part should have a small aspect ration (H/W), so that it is formed easily and it firmly adheres to the soft magnetic underlayer. The aspect ratio of the relieved part is usually H/Whf=1 to 2. With an aspect ratio of H/Whf>4, the resulting relieved part is unstable.

In this example, the shape of the relieved part is restricted such that Wt≦Wb on account of the imprinting process. If Wt>Wb, the recessed-relieved shape will be destroyed when the mold is removed in the imprinting process. However, if Wt≦Wb, it is possible to control the shape of the relieved part. In actuality, since it is necessary that Tside_SUL>0, it is desirable that Wt>Wb (in other words, the relieved part assumes an inverted trapezoid). Therefore, the restriction mentioned above is not detrimental to accepting the imprinting process. On the other hand, the fact that Wn, Tside_SUL, and Tsidemax can be controlled by the shape of the relieved part is one of the merits of forming the desired structure by the imprinting process.

The present invention differs from the conventional technology in which the recessed-relieved structure formed by imprinting is used as an etching mask (as disclosed in D. Wachnschwanz et al., IEEE 41 (2005) p. 670). Instead, it uses the transferred recessed-relieved structure directly as the recessed-relieved structure for the magnetic recording medium. Consequently, Hb is not essentially restricted. However, Hb should be smaller than 100 micro meter, preferably smaller than 10 micro meter, since an unnecessarily large Hb leads to a high production cost. On the other hand, the base layer may have a function to isolate the magnetic recording layer from the substrate, as explained above in Example 1. For this function to work satisfactorily, a certain thickness is required. The present inventor's experiment revealed that Hb should be about 5 nm at a minimum, preferably larger than about 30 nm. In other words, it was found that if Hb meets this condition, it is possible to keep the diffusion of impurities from the substrate below the allowable limit.

The above-mentioned condition for Hb also relaxes restrictions on the flatness of the substrate surface. Even in the case where a substrate with a large average surface roughness is used, the roughness of the outermost surface of the substrate is determined by the surface roughness of the intermediary body if the substrate is covered with the transferred body in a sufficient amount. This widens the selection of the material for the substrate which is sensitive to surface roughness.

In order to obtain an adequate value of Hb that meets the above-mentioned condition, it is important to properly control the pressing pressure for imprinting and make uniform the pressing pressure throughout the plane. In this example, the pressing pressure and pressing system were established so that Hb=500 nm.

tMAG denotes the thickness of the perpendicular recording layer. It should be small in order for the magnetic flux to be effectively introduced into the soft magnetic underlayer from the main pole of the recording head. However, if tMAG is too small, there will occur a problem with thermal fluctuation. In this example, tMAG is 15 nm. In general, tMAG should be in the range of about 3 to 30 nm.

This example demonstrates a magnetic recording layer comprised of a soft magnetic underlayer and a perpendicular recording layer. This example may be modified such that the perpendicular recording layer is formed by deposition, with the soft magnetic underlayer omitted, or the longitudinal recording layer may be formed by deposition. In this case, necessary values may be obtained assuming that ts=0 under the above-mentioned conditions.

This example demonstrates the production of DTM; but the same procedure as in this example can also be applied to the production of PM. In the case of PM, the pattern is formed not only in the track direction but also in the bit length direction. Therefore, the above-mentioned condition should be taken into consideration for the bit length direction.

Now, a comparison is made between the conventional manufacturing method and the method for production of PM and DTM according to the present invention. A method for producing PM and DTM is disclosed in Hattori et al., IEEE Trans. Magn. 40 (2004) p. 2510. The disclosed method consists of the steps of forming a magnetic recording layer on a flat substrate by deposition, forming a metal layer on the magnetic recording layer, forming a resist on the metal layer, transferring the desired structure to the resist by imprinting, etching the metal layer through the resist as a mask, and etching the magnetic recording layer by RIE or IBE through the metal layer as a mask. This method needs to perform IBE or RIE directly on the magnetic recording layer, and hence it is poor in productivity. Moreover, IBE or RIE usually requires a large-scale expensive equipment. By contrast, the method in Examples 1 and 2 according to the present invention needs neither IBE nor RIE and hence it permits economical mass production.

The procedure disclosed in the above-mentioned document causes the magnetic recording layer to come into direct contact with the substrate and hence it needs a specific substrate with a low content of impurities and a high hardness. By contrast, the method in Examples 1 and 2 according to the present invention employs the intermediary body which isolates the magnetic recording layer from the substrate and hence it does not need a specific substrate with a low content of impurities. This leads to the wide selection of materials (including substrates with a high hardness). The hard substrate makes the disk less subject to fluttering during high-speed running, and reduced fluttering decreases track misregistration and error rate at the time of reading and writing.

The current magnetic recording medium, which are constructed such that recording is made on both sides of the disk, have the disadvantage of requiring the steps of depositing the magnetic recording film on both sides of the substrate, forming the resist structure on both sides, and etching both sides by RIE or IM, if the recessed-relieved structure is to be formed on both sides of the substrate by the above-mentioned method. The magnetic recording medium produced in this manner is poor in productivity because RIE or IM is poor in productivity as mentioned above. Although there is an apparatus capable of performing RIE or IM on both sides simultaneously, it is complex and expensive and is not suitable for stable operation. On the other hand, forming the structure on the intermediary body by imprinting as demonstrated in Examples 1 and 2 takes no more time than required in performing imprinting on one side. Therefore, the process of the present invention helps improve productivity and reduce production cost in the case where the magnetic recording layers are to be formed on both sides.

There is another method disclosed in D. Wachenschwanz et al., IEEE Trans. Magn. 41 (2005) p. 670, which consists of the steps of making the recessed-relieved structure by imprinting on the resist which has been coated on a flat substrate, etching the substrate through the recessed-relieved structure of the resist as a mask so that the substrate has the recessed-relieved structure, and depositing the magnetic recording layer on the recessed-relieved structure. This method requires that the substrate itself undergo etching for the recessed-relieved structure. This additional etching step reduces productivity. Moreover, etching requires an expensive apparatus and hence impedes cost reduction. In addition, this method needs a specific substrate with a low content of impurities and a high hardness because the substrate having the recessed-relieved structure comes into direct contact with the magnetic recording layer.

By contrast, the method in Examples 1 and 2 according to the present invention does not need etching. Moreover, it does not impose restrictions on the content of impurities in the substrate because the intermediary body isolates the magnetic recording layer from the substrate. This effect has been mentioned above. Direct etching on the substrate poses a problem with variation of etching in the plane. Etching with a large variation in the plane leads to variation in the depth of etching and the size of pattern, which further leads to variation in the shape and characteristic properties from one substrate to another. Avoidance of this trouble requires a highly accurate process control which prevents cost reduction. One way of eliminating the highly accurate process control is by inserting an etch-resistant layer and using it as the etching stopping layer or etch detecting layer. However, this increases the production cost. Incidentally, the process disclosed in the above-mentioned document uses a substrate of NiP; however, the same effect will be produced even though the NiP substrate is replaced by a glass substrate. In addition, although etching used in that process is wet etching, dry etching, such as RIE, IBM, and IM, will produce the same effect.

There is a process for forming a recessed-relieved structure on a flat substrate, as disclosed in S. Y. Chou et al., Nature 417 (2002) p. 835. This process, which is not intended for magnetic recording medium, consists of the steps of pressing a mold against a Si substrate and melting the substrate itself by means of an intensive laser beam, thereby transferring the shape of the mold to the substrate. This process requires the substrate to be heated at an extremely high temperature for its melting. That is, the surface of the silicon substrate (which is used in the process disclosed in the above-mentioned document) should be heated above 1414° C., which is the melting point of silicon. Thus, the mold, which is brought into contact with the substrate, needs to have a melting point higher than that of the substrate so that the mold withstands this high temperature. This restricts the selection of materials. In the case where this process is applied to the production of magnetic recording medium (which is not mentioned in the document), the resulting magnetic recording medium are constructed such that the magnetic recording layer comes into direct contact with the substrate as mentioned above. Therefore, the effect of impurities in the substrate should be taken into consideration when the material for the substrate is selected. By contrast, the process used in Examples 1 and 2 explained above does not alter the substrate itself but alters only the intermediary body. Therefore, it allows a wide selection of substrate and mold and it can be executed easily. In addition, it permits the intermediary body to isolate impurities in the substrate, which leads to a wide selection of substrate materials and an improved reliability.

Example 3

Figure 4:
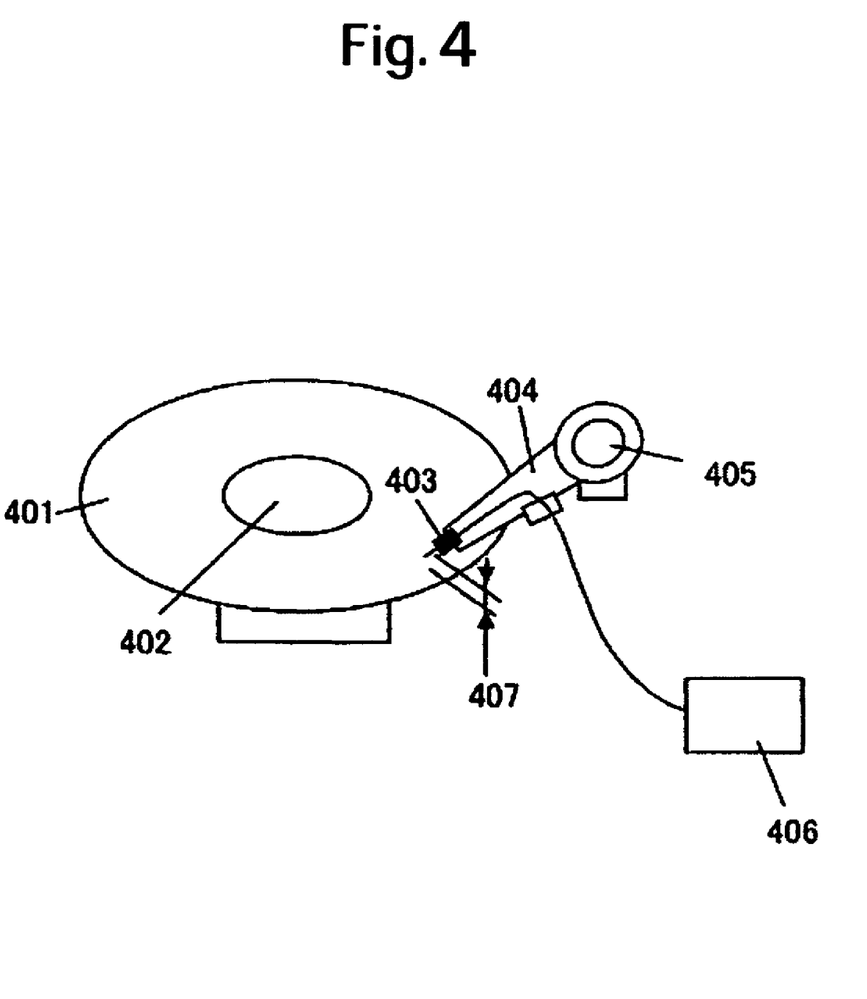
FIG. 4 is a schematic diagram illustrating the magnetic recording unit equipped with the magnetic recording medium of the present invention.

FIG. 4 is a schematic diagram illustrating the magnetic recording unit equipped with the magnetic recording medium 401 obtained according to the present invention. The magnetic recording medium 401 is attached to the spindle 402 so that it turns around the axis. The recording medium 401 used in this example is a PM which has both tracks and bits that are patterned therein.

The recording head used in this example is a so-called perpendicular head of single pole type (SPT). The head is comprised of a main magnetic pole of soft magnetic material and a coil of copper alloy. The tip of the main magnetic pole is made of cobalt-alloy having a saturation magnetic flux density (Bs) of 2.4 T. The read head uses a sensor film for giant magnetoresistance effect (GMR). This sensor film may be replaced by any other one for tunnel magnetoresistance effect. The recording and read heads are provided with cables for signal input and output. Signals are exchanged with the signal processing unit 406. The slider 403 is fixed to the gimbal 404, which is attached to the actuator 405. The slider 403 can be moved over the magnetic recording medium 401 by the actuator 405 and the spindle 402. The drive unit is provided with a load-unload mechanism (not shown), so that the head is unloaded from the recording region on the recording medium 401 when not in operation.

The drive unit causes the spindle 402 to turn the magnetic recording medium 401. Then it loads the heads on the magnetic recording medium 401 when a prescribed revolving speed is reached. The slider attains a desired flying height 407 owing to its grooves that produce the aerodynamic effect. The slider grooves should have an adequate shape which depends on the surface configuration of the magnetic recording medium 401. In this example, the slider is designed such that it keeps a flying height of about 5 nm when the revolving speed is 7200 rpm. It was found that crashing occurs frequently at such a flying height if the surface roughness of the intermediary body exceeds 2 nm. Therefore, an adequate material and process were selected as mentioned above so that the resulting intermediary body has a surface roughness smaller than about 2 nm.

The magnetic field originating from the recording head passes through the magnetic recording layer on the relieved part, thereby reaching SUL, so that the recording layer is magnetized in the desired direction. At the time of reading, the magnetic field originating from the recording bit is detected by the read head for signal processing.

The magnetic recording medium 410 in this example is a disk measuring Tp=150 nm, Wb=Wg=75 nm, and tMAG=15 nm, which has been explained in the foregoing examples. The recording head is a so-called single-pole head having a geometrical track width of Tww-geo=100 nm. In general, when Tww-geo is larger than Tp, there occurs a problem with writing in the adjacent track. In the case of DTM, writing does not take place in the region on Wn, and hence it has less restriction than flat recording medium. However, Tww-geo should not exceed twice the value of Tp. On the other hand, with an excessively small value, it does not provide the magnetic field necessary for recording. Results of simulation indicate that when Tww-geo is smaller than 0.2 times the value of Tp, it does not provide the magnetic field necessary for recording regardless of write current. Consequently, Tww-geo should be such that 0.2×Tp<Tww-geo<2.0×Tp. The read head is a CIP-GMR head with a geometrical read track width of Twr-geo=100 nm. Twr-geo should be such that 0.2×Tp<Twr-geo<1.0×Tp.

The conventional magnetic recording medium with a continuous flat film does not have the bit and track structure; it becomes to have bits and tracks only after it has been built into the magnetic recording unit and it has had information recorded by the head. However, PM or DTM has a previously designed bit length (L) and track pitch (Tp) so that it provides a necessary recording density, and this requirement is met by forming the recessed-relieved structure by lithography. The track pitch is defined by the serve pattern corresponding to the previously formed recessed-relieved pattern. The read head reads the servo information corresponding to the recessed-relieved structure and determines its position based on the thus read information. The process of producing the magnetic recording medium in the above-mentioned examples is designed such that the accuracy of central positioning is within ±50 micro meter. Therefore, the magnetic recording unit according to this example has the sufficient accuracy to follow owing to the serve mechanism built into it. Any magnetic recording medium with the accuracy of central positioning exceeding 50 micro meter will have a high error rate because the serve mechanism does not follow completely.

Recording should be carried out in such a way that the recording head flies above the relieved region of the intermediary body in the magnetic recording medium. The servo pattern is detected by the read head, so that it accurately follows the track at the time of reproduction. However, if the read head and the recording head are relatively displaced at the time of recording, it is necessary to correct displacement and control their positions. To this end, it is desirable to measure the amount of displacement of the read head and the recording head and make correction according to the thus obtained information. The information about the amount of displacement is stored in the signal processing unit 406 for the individual heads. However, this mechanism is not necessary if the amount of displacement is negligibly small at the time of RW operation. Also, in the case where variation is small in the amount of displacement for individual heads, the amount of displacement may be regarded as constant.

As to the bit length of PM, it is necessary to adjust the revolving speed and the write frequency according to the radius of the disk so that recording can be accomplished in synchronism with the frequency of the given structure. The signal processing system 406 should be constituted to make such control possible.

The magnetic recording unit equipped with the magnetic recording medium of the present invention exhibited good read-write characteristics in the test. Moreover, the magnetic recording unit was found to be less expensive than any conventional PM and DTM. To be concrete, it was constructed without the expensive etching apparatus (worth 200 million yens) which is essential for the conventional process. The production of the magnetic recording medium according to the present invention only needs an additional cost for the material of the intermediary body. This leads to a very large cost saving. Moreover, the process according to the present invention saves the time for etching; this leads to an improved productivity (about 10 seconds per disk).

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic recording medium comprising:
   a flat substrate;
   a nonmagnetic intermediary body formed from a photo-cured photo-curable material on at least one surface of said substrate; and
   a magnetic recording layer formed on said nonmagnetic intermediary body,
   wherein said nonmagnetic intermediary body has a recessed-relieved structure corresponding to a track pitch or a bit period on a surface thereof, said recessed-relieved structure of the nonmagnetic intermediary body not extending to a surface of said substrate.

2. The magnetic recording medium as defined in claim 1, wherein the nonmagnetic intermediary body is one which has the recessed-relieved structure thereon corresponding to a servo pattern.

3. The magnetic recording medium as defined in claim 1, wherein the magnetic recording layer has a thickness smaller than about 2.0 times the difference in height between recess and relief in the track part or the bit part.

4. The magnetic recording medium as defined in claim 1, wherein a base layer of the nonmagnetic intermediary body has a thickness larger than about 5 nm, wherein the nonmagnetic intermediary body has a concentration of alkaline ionicity impurities lower than about 1 ppm.

5. The magnetic recording medium as defined in claim 1, wherein the nonmagnetic intermediary body is formed such that an outermost surface of a relieved part thereof has an average surface roughness (RA) smaller than about 2 nm.

6. The magnetic recording medium as defined in claim 1, wherein the magnetic recording layer includes a soft magnetic underlayer, an intermediate layer, and a perpendicular magnetic recording layer.

7. The magnetic recording medium as defined in claim 1, wherein the magnetic recording layer has concave parts thereof filled with a nonmagnetic material which exhibits characterizations of being formed after deposition of the magnetic recording layer and has an outermost surface thereof planarized.

8. The magnetic recording medium as defined in claim 1, wherein the nonmagnetic intermediary body has a volume fraction porosity smaller than about 0.05.

9. A magnetic recording medium comprising:
a flat substrate;
a nonmagnetic intermediary body formed from a photocurable material on at least one surface of the substrate; and
a magnetic recording layer positioned above the nonmagnetic intermediary body,
wherein the nonmagnetic intermediary body has a recessed-relieved structure corresponding to a track pitch or a bit period on a surface thereof,
wherein widths (Wt) of top regions of relieved portions of the nonmagnetic intermediary body are smaller than widths (Wb) of bottom regions of the relieved portions of the nonmagnetic intermediary body.

10. The magnetic recording medium as defined in claim 9, wherein the recessed-relieved structure defines a plurality of circumferentially formed discrete tracks, wherein the circumferentially formed discrete tracks are not patterned in a bit length direction.

11. The magnetic recording medium as defined in claim 9, wherein the recessed-relieved structure of the nonmagnetic intermediary body does not extend to a surface of the substrate.

12. The magnetic recording medium as defined in claim 9, further comprising a nonmagnetic material in recessed portions of the nonmagnetic intermediary body and positioned between and in a same plane as portions of the magnetic layer positioned above relieved portions of the nonmagnetic intermediary body.

13. The magnetic recording medium as defined in claim 9, wherein at least portions of the magnetic recording layer are positioned above relieved portions of the nonmagnetic intermediary body, and further comprising at least one of a protective film and a lubricating film positioned above the at least portions of the magnetic recording layer that are positioned above the relieved portions of the nonmagnetic intermediary body.

14. The magnetic recording medium as defined in claim 9, wherein the soft underlayer extends as a continuous layer above the nonmagnetic intermediary body, and the magnetic recording layer extends as a continuous layer above the soft underlayer.

15. A magnetic data storage system, comprising:
at least one magnetic head
a magnetic recording medium as recited in claim 9;
a spindle for allowing turning of the magnetic recording medium; and
a signal processing unit electrically coupled to the at least one magnetic head.

16. A magnetic recording medium comprising:
a flat substrate;
a nonmagnetic intermediary body formed from a photocurable material on at least one surface of the substrate, wherein the nonmagnetic intermediary body has recessed and relieved portions in a recessed-relieved structure corresponding to a track pitch or a bit period on a surface thereof;
a soft underlayer above the relieved portions of the intermediary body;
a magnetic recording layer positioned above the soft underlayer; and
a nonmagnetic material in the recessed portions of the nonmagnetic intermediary body.

17. The magnetic recording medium as defined in claim 16, wherein the recessed-relieved structure of the nonmagnetic intermediary body does not extend to a surface of the substrate.

18. The magnetic recording medium as defined in claim 16, wherein the soft underlayer and magnetic recording layer are also positioned in the recessed portions of the nonmagnetic intermediary body and under the nonmagnetic material in the recessed portions.

19. The magnetic recording medium as defined in claim 16, wherein the soft underlayer extends as a continuous layer above the nonmagnetic intermediary body, and the magnetic recording layer extends as a continuous layer above the soft underlayer.

20. A magnetic data storage system, comprising:
at least one magnetic head;
a magnetic recording medium as recited in claim 16;
a spindle for allowing turning of the magnetic recording medium; and
a signal processing unit electrically coupled to the at least one magnetic head.

21. The magnetic recording medium as defined in claim 1, further comprising a nonmagnetic material in recessed portions of the nonmagnetic intermediary body and positioned between and in a same plane as portions of the magnetic layer positioned above relieved portions of the nonmagnetic intermediary body.

22. The magnetic recording medium as defined in claim 1, wherein at least portions of the magnetic recording layer are positioned above relieved portions of the nonmagnetic intermediary body, and further comprising at least one of a protective film and a lubricating film positioned above the at least portions of the magnetic recording layer that are positioned above the relieved portions of the nonmagnetic intermediary body.

23. The magnetic recording medium as defined in claim 1, further comprising a soft underlayer extending as a continuous layer above the nonmagnetic intermediary body, and a magnetic recording layer extending as a continuous layer above the soft underlayer.

24. The magnetic recording medium as defined in claim 23, further comprising a nonmagnetic material in recessed portions of the nonmagnetic intermediary body and positioned between and in a same plane as portions of the magnetic layer positioned above relieved portions of the nonmagnetic intermediary body.

25. A magnetic data storage system, comprising:
at least one magnetic head;
a magnetic recording medium as recited in claim 1;
a spindle for allowing turning of the magnetic recording medium; and
a signal processing unit electrically coupled to the at least one magnetic head.

* * * * *